R. J. MANDERFIELD.
IMPLEMENT ADJUSTING DEVICE FOR CULTIVATORS AND THE LIKE.
APPLICATION FILED MAY 3, 1913.
1,091,681.
Patented Mar. 31, 1914.
2 SHEETS—SHEET 2.
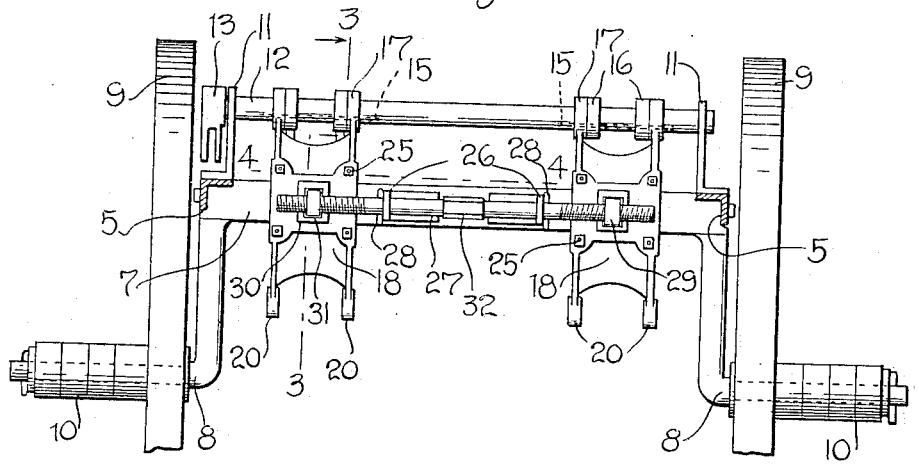
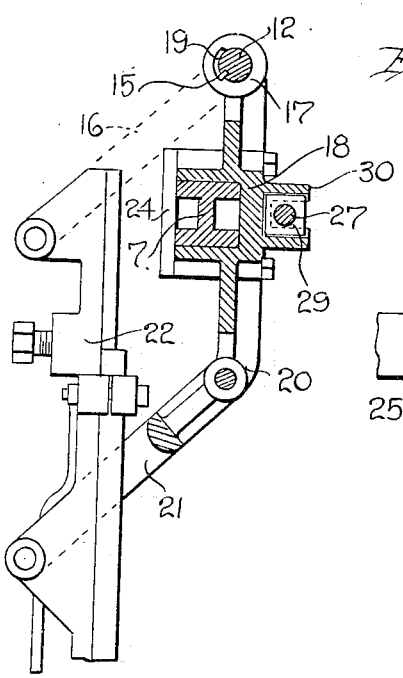
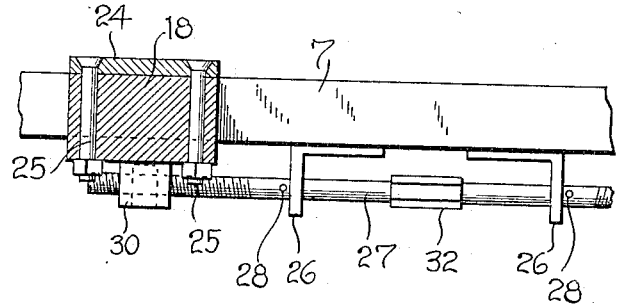
Witnesses
Robert M. Sutphen
A. J. Hind
Inventor
R. J. MANDERFIELD
By Watson E. Coleman
Attorney

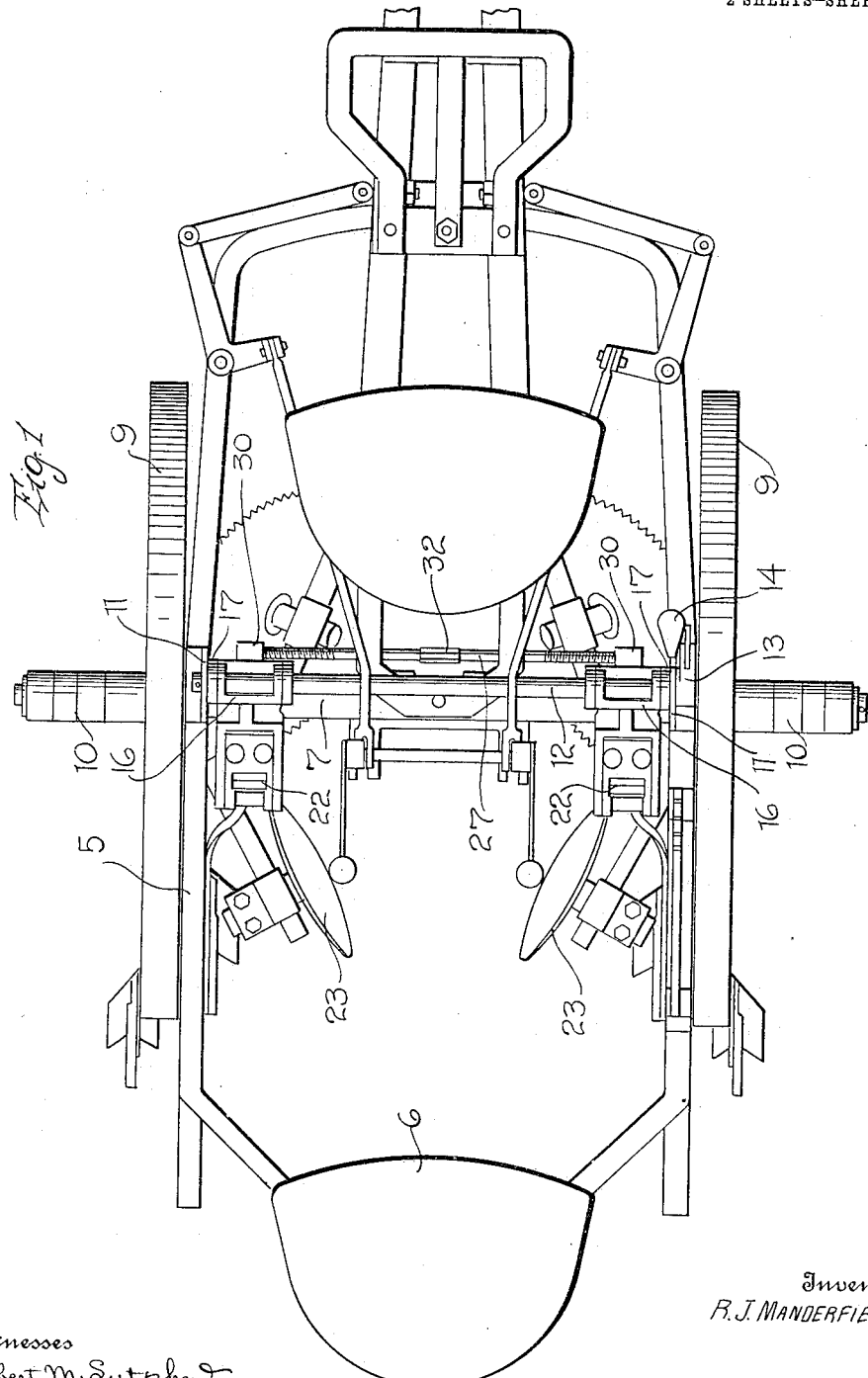

UNITED STATES PATENT OFFICE.

ROBERT J. MANDERFIELD, OF HOUGHTON, MICHIGAN.

IMPLEMENT-ADJUSTING DEVICE FOR CULTIVATORS AND THE LIKE.

1,091,681.   Specification of Letters Patent.   Patented Mar. 31, 1914.

Application filed May 3, 1913. Serial No. 765,371.

*To all whom it may concern:*

Be it known that I, ROBERT J. MANDERFIELD, citizen of the United States, residing at Houghton, in the county of Houghton and State of Michigan, have invented certain new and useful Improvements in Implement-Adjusting Devices for Cultivators and the like, of which the following is a specification, reference being had to the accompanying drawings.

This invention relates to improvements in a combined weeding and cultivating machine of that type shown and described in my prior application for patent filed November 1, 1912, Serial No. 729,178, though it is to be understood that the invention forming the subject matter of this application is not limited in its utility to such specific machine structure as it is applicable to machines employed for various purposes.

The present invention has reference more particularly to the provision of a simple and novel device for easily and quickly adjusting the implement carrying bars with relation to the supporting wheels of the machine in accordance with the width of the plant row.

Another and more specific object of the invention is to provide a pair of relatively movable supporting members mounted upon the arch bar connecting the wheel axles, a shaft mounted in said members, implement carrying bars supported by the shaft, and means adjustably mounted upon the arch bar for moving said members toward and from each other.

The invention has for a still further object to generally improve the construction of the machine disclosed in my prior application, increase its scope of utility and efficiency in operation and render the same reliable and serviceable in actual use.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a top plan view of a machine such as that illustrated in my application above referred to, to which the present invention is applied. Fig. 2 is a front elevation, many of the parts unnecessary to a clear understanding of the invention being omitted. Fig. 3 is a section taken on the line 3—3 of Fig. 2; and Fig. 4 is a section taken on the line 4—4 of Fig. 2.

Referring in detail to the drawings, 5 designates the frame of the machine which is preferably of the form shown in Fig. 1 and is constructed of angle iron. Upon the rear ends of the parallel side bars of this frame, a suitable driver's seat 6 is mounted. This frame is secured upon opposite ends of the arch bar 7 which connects the stub axles 8 upon which the ground wheels 9 are mounted. These wheels are preferably longitudinally adjustable upon their respective axles in accordance with the width of the plant row and are held in such positions by means of a series of collars 10 arranged upon the axle.

Upon the side bars of the frame 5 and immediately above the ends of the arch bar 7, the brackets 11 are secured. In the upper ends of these brackets, the ends of a transversely disposed shaft 12 are journaled for oscillatory movement. To one end of this shaft an arm 13 is fixed, said arm being connected to a lever 14, whereby the shaft may be rocked by the operator for a purpose to be later explained.

The shaft 12 is provided upon each side of its central portion with a key 15, the shaft having grooves or key ways therein to receive said keys. Upon the shaft 12, a pair of lifting members 16 are loosely engaged, each of said members having spaced arms on its upper end provided with arcuate recesses for the accommodation of the keys 15, such recesses permitting of a limited movement of the lifting members upon the shaft with respect thereto. The arms on the upper ends of these lifting members are arranged between the spaced arms 17 formed upon the upper ends of the adjustable slide members 18, said slide members effectually preventing any shifting movement of the lifting members 16 with relation to each other. The shaft receiving openings in the arms 17 are also provided in their walls with arcuate recesses 19 for the accommodation of the keys 15. The slide members 18 are also formed with a pair of depending arms 20 which extend below the arch bar 7. Between the arms 20 of each slide member, an additional lifting member 21 is pivotally mounted at its forward end. These lifting members 16 and 21 extend rearwardly and are pivotally connected to the vertically disposed implement carrying bars 22. Cultivating plows, shovels, disks, weeding disks or any other desired implements are mounted upon these bars. These implements are generally indicated by the numeral 23 and as the specific manner of securing the same upon the bars 22 is fully disclosed in my prior application, the same will not here be described in detail. It will suffice to state that by providing the arcuate recesses 19 in the upper ends of the arms 17 of the slide members 18, a limited oscillatory movement of the shaft 12 is permitted, so that the keys 15 engaging one end of the recesses in the arms of the lifting members 16 will move said members upwardly at their rear ends and thus lift the bar 22 and raise the implements mounted thereon from their operative positions.

Each of the slide members as shown in Fig. 3 is provided with a channel or recess in its body to receive the arch bar 7, and upon one side of the arch bar, the plate 24 is arranged and secured to the body of the slide member by means of the bolts 25. These plates simply retain the members 18 upon the arch bar and do not clamp the same tight enough to prevent the sliding movement thereof. To one side of the arch bar 7, the angular guide brackets 26 are secured and in these brackets, the adjusting rod 27 is loosely mounted. Stop pins indicated at 28 are disposed through the rod adjacent each of the brackets and prevent longitudinal movement of the rod in said brackets. The end portions of the rod 27 are provided with threads extending in relatively opposite directions. Upon the same, the nuts 29 are threaded. Each of the slide members 18 is provided with an integral extension 30 having an open pocket or chamber 31 formed therein to receive one of the nuts 29 on the rod 27. The adjusting rod is provided intermediate of its ends and between the supporting brackets 26 with a hexagonal enlargement 32 whereby the same may be turned or rotated in the brackets. From this construction, it will be obvious that by turning the rod 27 in the proper direction, the slide members 18 may be moved inwardly or outwardly upon the arch bar 7, thereby relatively positioning the two groups of implements 23, as may be found necessary in accordance with the width of the plant row being operated upon.

From the foregoing, it is believed that the construction, manner of operation and several advantages of my improved adjusting device for the implement groups will be clearly and fully understood.

The invention is particularly desirable for use upon machines of that character disclosed in my prior application wherein a number of implements are comprised in each group and eliminates considerable labor which would otherwise be necessitated in order to obtain the proper position of the implement groups with relation to each other. It will therefore be appreciated that by means of the present invention, I have greatly increased the utility and efficiency of such machines.

While I have described and illustrated the preferred construction and arrangement of the several elements employed, it will be understood that the invention is susceptible of a great many modifications therein and I reserve the right to resort to all such changes as may fairly fall within the scope of the appended claims.

Having thus described the invention, what is claimed is:

1. In a machine of the character described including an arch axle bar, brackets arranged at the ends of said axle bar, a shaft journaled at its ends in said brackets, implement carrying members slidable upon said shaft and also adapted to oscillate upon the shaft independently thereof, said shaft being provided with keys for engagement with said members when the shaft is rotated, whereby said members are elevated and the implements carried thereby raised from their operative positions, slide members longitudinally movable upon the axle bar and engaging said implement carrying members and means mounted upon the axle bar for moving said slide members toward or from each other to adjustably space the implement carrying members upon said shaft.

2. In a machine of the character described, including an arch axle bar, a shaft mounted above said axle bar, implement carrying members arranged in spaced relation upon said shaft for sliding movement thereon, slide members longitudinally movable upon the axle bar and loosely engaged upon said shaft and coöperating with the implement carrying members to hold the same against longitudinal movement on the shaft, and an adjusting rod mounted upon the axle bar and connecting said slide members to move the same toward or from each other and relatively adjust said implement carrying members upon the shaft.

3. In a machine of the character described including an arch axle bar, a shaft mounted above said bar, implement carrying members loosely engaged upon said shaft, a pair of slide members longitudinally movable upon the axle bar and each provided with spaced arms loosely engaged upon the shaft and disposed upon opposite sides of the respective implement carrying members thereon, spaced brackets secured to the axle bar, an adjusting rod rotatably mounted in said brackets, and nuts threaded upon the opposite ends of said rod and engaged with the respective slide members to move the same and adjust the implement carrying members on the shaft toward or from each other to relatively space the implements carried thereby.

4. In a machine of the character described including an arch axle bar, a shaft mounted above said axle bar, slide members mounted upon the axle bar each having a pair of arms extending above and below said bar, the upper arms of said slide members being loosely engaged upon said shaft, a pair of implement carrying members, one of which is pivotally mounted between the lower arms of the slide, the other member being loosely engaged upon said shaft between the upper arms of the slide, spaced brackets fixed to the axle bar, an adjusting rod rotatably mounted in said brackets, the ends of said rod being oppositely threaded, a nut having threaded engagement upon each end of said rod, and an extension formed upon each of the slides engaged with the respective nuts whereby the slides are moved toward or from each other when said rod is turned to relatively position the implement carrying members and space the implements carried thereby.

In testimony whereof I hereunto affix my signature in the presence of witnesses.

ROBERT J. MANDERFIELD.

Witnesses:
PETER F. MANDERFIELD,
ALFRED R. PRIMEAU,
JOSEPH H. PRIMEAU.

Copies of this patent may be obtained for five cents each, by addressing the "Commissioner of Patents, Washington, D. C."